United States Patent
Song et al.

(10) Patent No.: US 6,560,371 B1
(45) Date of Patent: May 6, 2003

(54) APPARATUS AND METHOD FOR EMPLOYING M-ARY PYRAMIDS WITH N-SCALE TILING

(75) Inventors: Xudong Song, Princeton, NJ (US); Tihao Chiang, Plainsboro, NJ (US); Ya-Qin Zhang, Cranbury, NJ (US); Ravi Krishnamurthy, Plainsboro, NJ (US)

(73) Assignee: Sarnoff Corporation, Princeton, NJ (US)

(*) Notice: Subject to any disclaimer, the term of this patent is extended or adjusted under 35 U.S.C. 154(b) by 711 days.

(21) Appl. No.: 09/106,707

(22) Filed: Jun. 29, 1998

Related U.S. Application Data

(63) Continuation-in-part of application No. 09/002,258, filed on Dec. 31, 1997, now Pat. No. 6,408,101.

(51) Int. Cl.⁷ ............................................... G06K 9/36
(52) U.S. Cl. ....................................................... 382/240
(58) Field of Search .............................. 382/232, 236, 382/238, 239, 240, 248, 250; 348/384, 394, 395, 400, 401, 402, 403, 404, 407, 408, 409, 410, 412, 413, 414, 415, 416, 417, 418, 419, 420, 421, 422, 430, 431

(56) References Cited

U.S. PATENT DOCUMENTS

| | | | | |
|---|---|---|---|---|
| 5,278,915 A | * | 1/1994 | Chupeau et al. ............. | 382/236 |
| 5,321,776 A | * | 6/1994 | Shapiro ....................... | 382/240 |
| 5,333,012 A | * | 7/1994 | Singhal et al. .............. | 382/240 |
| 5,563,960 A | * | 10/1996 | Shapiro ....................... | 382/240 |
| 5,602,589 A | * | 2/1997 | Vishwanath et al. ........ | 382/240 |
| 5,748,787 A | * | 5/1998 | Sugiyama .................... | 382/240 |
| 5,777,677 A | * | 7/1998 | Linzer et al. ................ | 382/240 |
| 5,799,110 A | * | 8/1998 | Israelsen et al. ............ | 382/240 |

OTHER PUBLICATIONS

Song X et al: "A Hierarchical Motion Estimation Algorithm Using Nonlinear Pyramid for MPEG–2"; Proc. of 1997 IEEE Internat. Symp. on Circuits and Systems, Hong Kong, Jun. 9–12, 1997, vol. 2, pp. 1165–1168, abstract and paragraph 2.

Hideyoshi Tominaga et al: "A Motion Detection Method on Video Image by Using Hierarchical Pixels"; Systems & Computers in Japan, vol. 21, No. 9, 1990, pp. 24–33, abstract, paragraph 6; figure 6.

Lai M M L et al: "Coding of Image Sequences Using Variable Size Block Matching and Vector Quantization with Grey–Level Segmentation and Background Memory"; Process of the Singapore Internat. Conf. on Image Processing; Singapore Sep. 7–11, 1992, vol. 2, No. 377, 1992, pp. 303–307.

"Displacement Estimation by Hierarchical Blockmatching", M. Bierling, SPIE vol. 1001 Visual Communications and Image Processing '88, pp. 942–951.

"A Fast Hierarchical Motion–Compensation Scheme for Video Coding Using Block Feature Matching", X. Lee, Y. Zhang, IEEE Trans. on Circuits and Systems for Video Technology, vol. 6, No. 6, Dec. 1996, pp. 627–635.

\* cited by examiner

*Primary Examiner*—Jose L. Couso
(74) *Attorney, Agent, or Firm*—William J. Burke

(57) ABSTRACT

An apparatus and a concomitant method for using M-ary pyramid decomposition in combination with N-scale tiling to reduce the computational complexity in determining motion vectors for block-based motion estimation is disclosed.

20 Claims, 7 Drawing Sheets

APPARATUS AND METHOD FOR EMPLOYING M-ARY PYRAMIDS WITH N-SCALE TILING

This is a continuation-in-part of application Ser. No. 09/002,258, filed on Dec. 31, 1997 now U.S. Pat. No. 6,408,101.

The invention relates generally to a system for encoding image sequences and, more particularly, to an apparatus and a concomitant method that employs "multi-scale block tiling" to reduce the computational complexity in determining motion vectors for block-based motion estimation and to enhance the accuracy of motion estimates.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications which can benefit from efficient video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation/compensation. In brief, the encoder only encodes the differences relative to areas that are shifted with respect to the areas coded. Namely, motion estimation is a process of determining the direction and magnitude of motion (motion vectors) for an area (e.g., a block or macroblock) in the current frame relative to one or more reference frames. Whereas, motion compensation is a process of using the motion vectors to generate a prediction (predicted image) of the current frame. The difference between the current frame and the predicted frame results in a residual signal (error signal), which contains substantially less information than the current frame itself. Thus, a significant saving in coding bits is realized by encoding and transmitting only the residual signal and the corresponding motion vectors.

To illustrate, in a sequence containing motion, a current frame can be reconstructed using an immediately preceding frame and the residual signal representing the difference between the current and the immediately preceding frame. The transmitter or encoder transmits the preceding frame, the residual signal and the corresponding motion vectors to a receiver. At the receiver, the current frame is reconstructed by combining the preceding frame with the residual signal and the motion information. Consequently, only one (1) frame and the difference information with its associated motion vectors are transmitted and received rather than two (2) entire frames.

However, encoder designers must address the dichotomy of attempting to increase the precision of the motion estimation process to minimize the residual signal (i.e., reducing coding bits) or accepting a lower level of precision in the motion estimation process to minimize the computational overhead. Namely, determining the motion vectors from the frame sequence requires intensive searching between frames to determine the motion information. A more intensive search will generate a more precise set of motion vectors at the expense of more computational cycles.

For examples, many systems determine motion information using a so-called block based approach. In a simple block based approach, the current frame is divided into a number of blocks of pixels (referred to hereinafter as the "current blocks"). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. Once a block match is found, the location of matching block in the search area in the previous frame relative to the location of the current block within the current frame defines a motion vector. This approach, i.e., comparing each current block to an entire selected search area, is known as a full search approach or the exhaustive search approach. The determination of motion vectors by the exhaustive search approach is computationally intensive, especially where the search area is particularly large. As such, these systems tend to be relatively slow in processing the frames and expensive to fabricate.

Therefore, there is a need in the art for an apparatus and a concomitant method for reducing the computational complexity in determining motion vectors for block-based motion estimation.

SUMMARY OF THE INVENTION

The present invention is an apparatus and method that employs "multi-scale block tiling" (N-scale tiling) to reduce the computational complexity in determining motion vectors for block-based motion estimation and to enhance the accuracy of motion estimation methods. More specifically, the present invention decomposes each of the image frames within an image sequence into an M-ary pyramid. Next, N-scale tiling is employed with the M-ary pyramid to effect hierarchical motion estimation. N-scale tiling is the process of performing motion estimation for a current block of the frame using "N" different "tiling block" sizes. For example, if N is set to three, then three (3) motion vectors are generated for each block within each frame, i.e., the block is "tiled" with three different block sizes or scales. Thus, hierarchical motion estimation with N-scale tiling allows an encoder to discriminate between the motion of larger structures versus the motion of smaller features within the frame under consideration.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
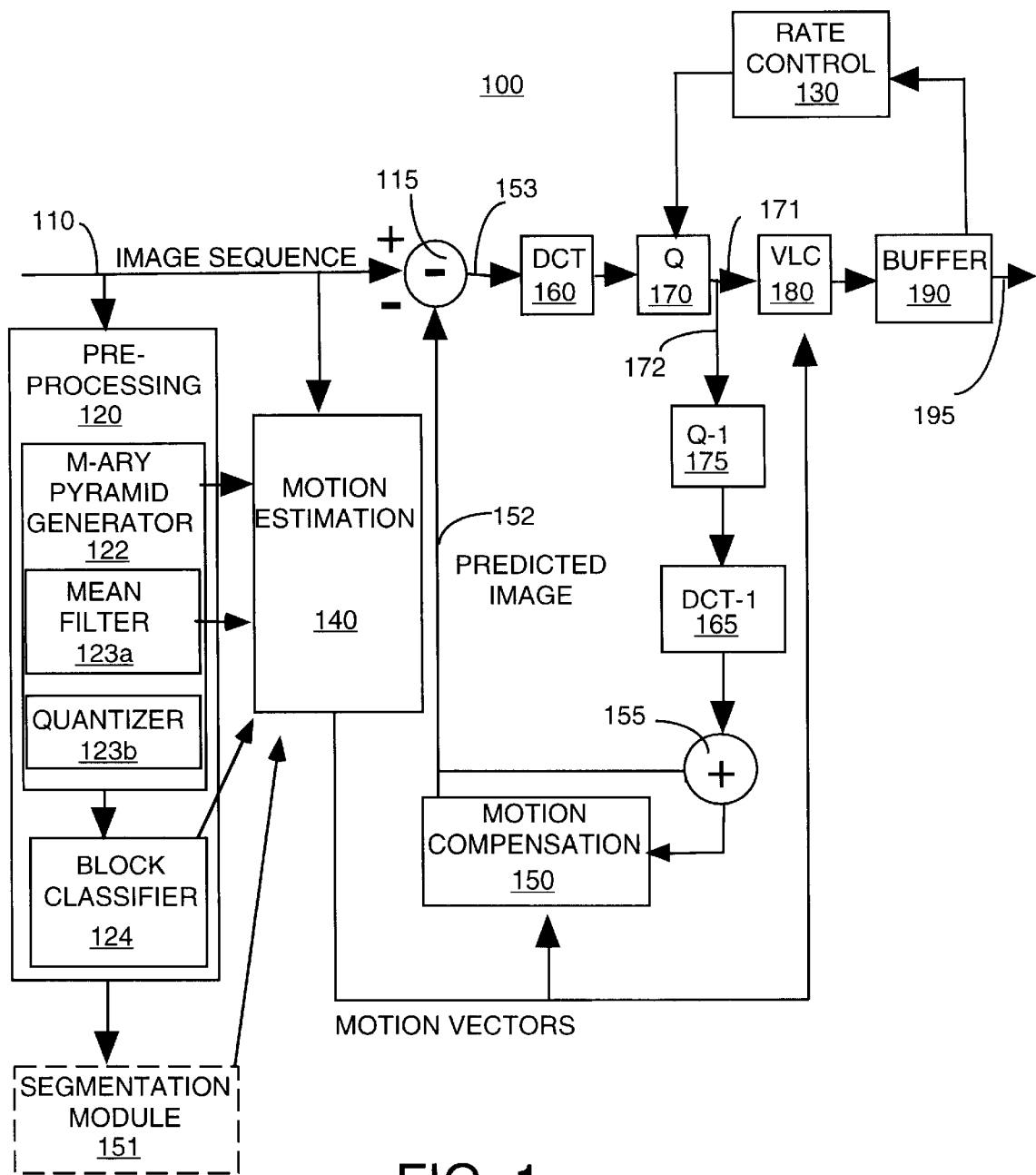
FIG. 1 illustrates a block diagram of the encoder of the present invention for reducing the computational complexity in determining motion vectors for block-based motion estimation.

FIG. 1 depicts a block diagram of the apparatus 100 of the present invention for reducing the computational complexity in determining motion vectors for block-based motion estimation. The preferred embodiment of the present invention is described below using an encoder, but it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*) and MPEG-2 (13818-*), H.261 and H.263.

The apparatus 100 is an encoder or a portion of a more complex block-based motion compensated coding system. The apparatus 100 comprises a motion estimation module 140, a motion compensation module 150, an optional segmentation module 151, a preprocessing module 120, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below).

The following disclosure uses the MPEG standard terminology; however, it should be understood that the term macroblock or block in the present invention is intended to describe a block of pixels of any size or shape that is used for the basis of encoding. Broadly speaking, a "macroblock" could be as small as a single pixel, or as large as an entire video frame.

In the preferred embodiment, the digitized input image signal undergoes one or more preprocessing steps in the preprocessing module 120. More specifically, preprocessing module 120 comprises a pyramid generator 122 and a block classifier 124. The M-ary pyramid generator 122 employs a mean filter 123a and a quantizer 123b to filter and to quantize each frame into a plurality of different resolutions, i.e., an M-ary pyramid of resolutions, where the different resolutions of each frame are correlated in a hierarchical fashion as described below. In turn, using the pyramid of resolutions, the block classifier 124 is able to quickly classify areas (blocks) as areas of high activity or low activity. A detailed description is provided below for the functions performed by the preprocessing module 120.

The input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In the preferred embodiment, the motion estimation module 140 also receives information from the preprocessing module 120 to enhance the performance of the motion estimation process.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. A rate control method may control the number of coding bits by adjusting the quantization scales.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

Figure 2:
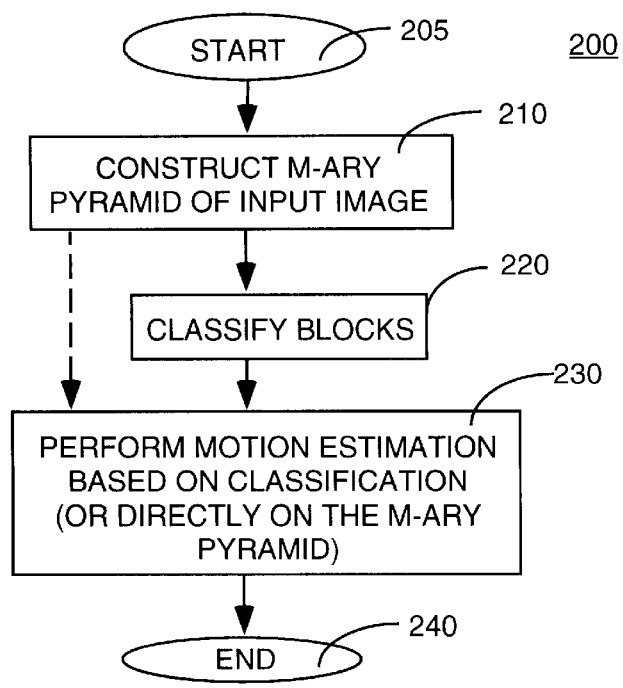
FIG. 2 illustrates a flowchart of a method for reducing the computational complexity in determining motion vectors for block-based motion estimation.

FIG. 2 illustrates a flowchart of a method 200 for reducing the computational complexity in determining motion vectors for block-based motion estimation. Namely, the method 200 enhances a block-based motion estimation method by quickly defining an initial search area where a match will likely occur.

More specifically, method 200 starts in step 205 and proceeds to step 210 where an M-ary pyramid (or M-ary mean pyramid) is generated for each image frame in the image sequence. A detailed description on the method of generating an M-ary pyramid is provided below with reference to FIGS. 3, 4, and 10.

Figure 10:
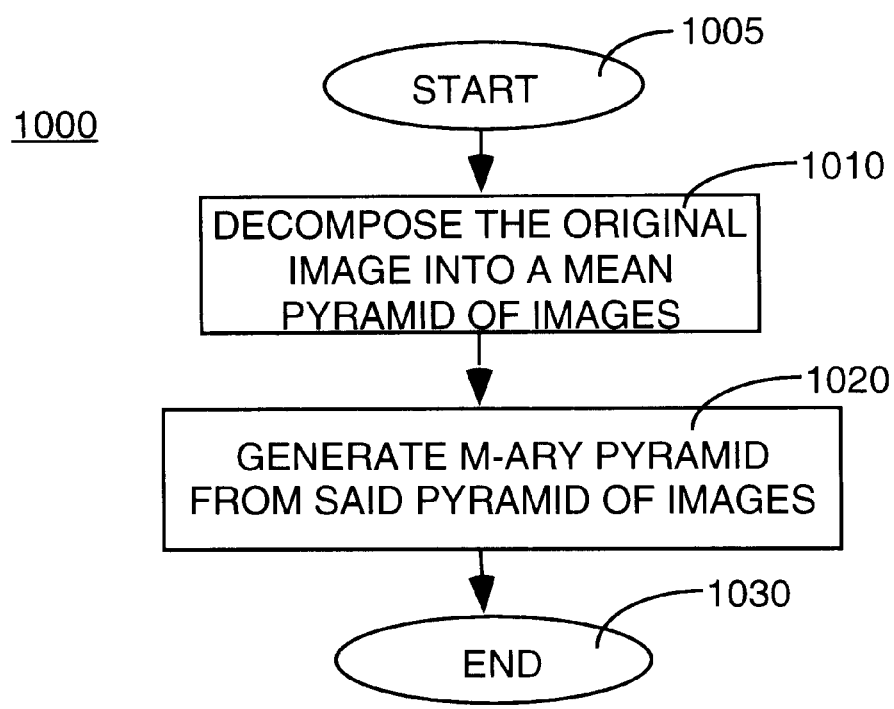
FIG. 10 illustrates a flowchart of a method for generating an M-ary pyramid for an image.

More specifically, FIG. 10 illustrates a flowchart of a method 1000 for generating an M-ary pyramid for an image. The method starts in step 1005 and proceeds to step 1010 where the original image is decomposed into a mean pyramid of images.

Figure 3:
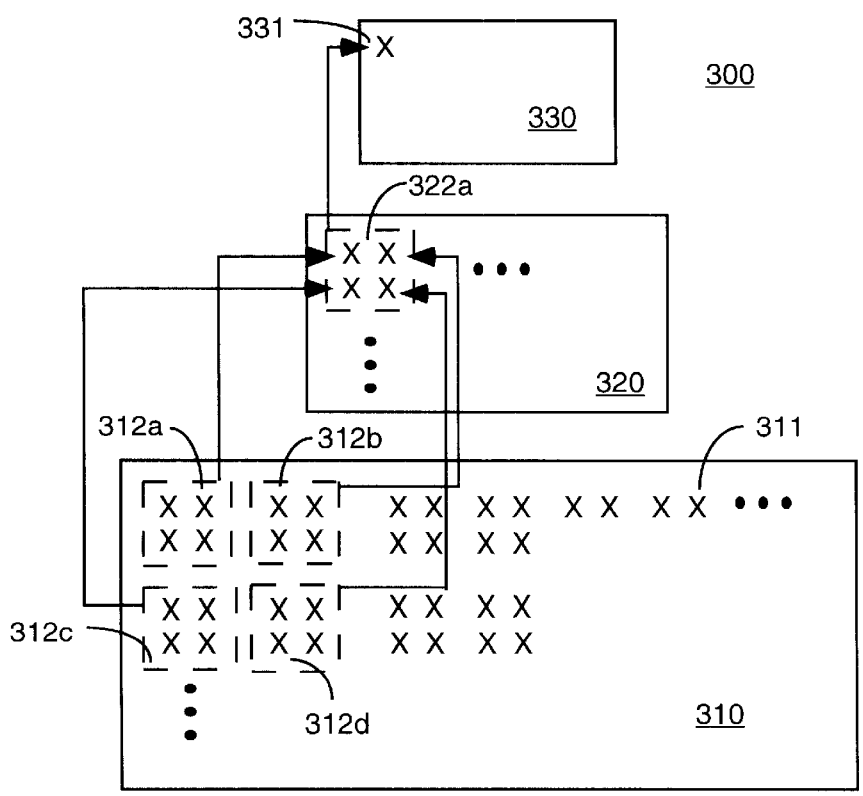
FIG. 3 illustrates a block diagram of a general mean pyramid.

FIG. 3 illustrates a block diagram of a general mean pyramid 300, where the mean pyramid comprises a plurality of levels 310, 320 and 330. The lowest level 310 is an original image frame from the image sequence having a plurality of pixels 311 represented by "x"s. Typically, these pixels are represented by pixel values having a range that is limited by the number of bits allocated to represent the pixel values. For example, if eight (8) bits are allocated, then a pixel value may take a value from one of 256 possible values.

In a mean pyramid, a next higher level is generated by lowpass filtering and downsampling by a factor of two in both directions, thereby generating a single pixel value (parent) for a higher level from four (4) pixel values (children) in a lower level. This is illustrated in FIG. 3, where each set of four pixels 312*a–d* is used to generate a single pixel value 321 in level 320. In turn, the set of four pixel values 322*a* is used to generate a single pixel value 331 in level 330 and so on. It should be understood that the present invention is not limited to a mean pyramid having three levels. The number of levels is generally limited by the size of the image and the downsampling factor selected to generate the next lower resolution image. Thus, the number of levels in the mean pyramid can be selected for a particular application.

In a mean pyramid, the parent pixel value is derived by taking the average of its four children pixel values, thus the term mean pyramid. However, other measure or metric can be used to generate other types of pyramids, e.g., the measure can be based on the median of the four children pixel values. Alternatively, a larger area around the children pixels can be used for a weighted average to obtain a general lowpass pyramid.

Returning to FIG. 10, method 1000 then generate an M-ary pyramid from said mean pyramid in step 1020. Namely, in an "M-ary pyramid", the pixel values are quantized such that each quantized pixel value can only take "M" possible pixel values. For example, if M equals to two (2), then each quantized pixel value, can take on a value of 0 or 1, i.e., resulting in a "binary pyramid".

Figure 4:
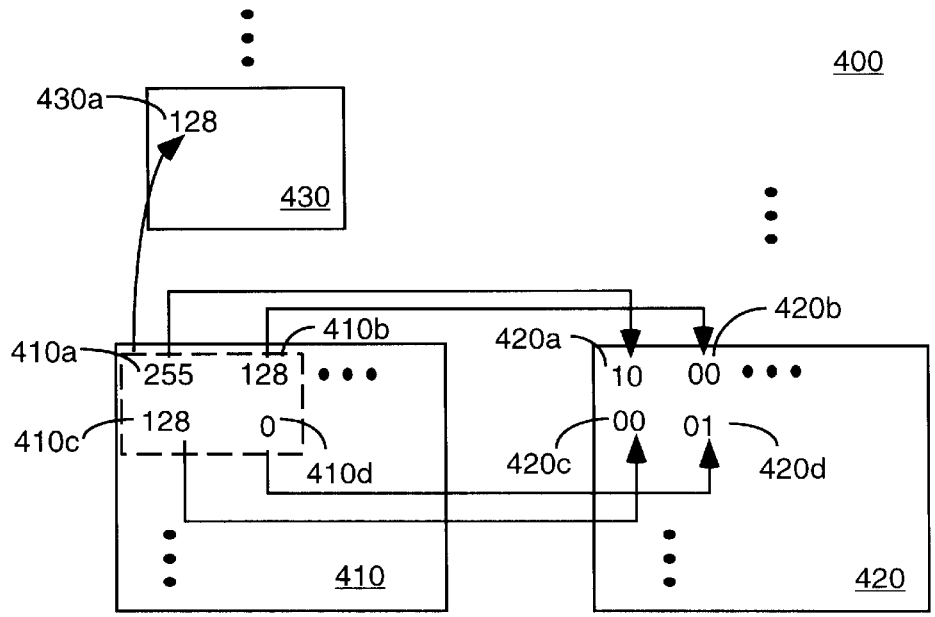
FIG. 4 illustrates a block diagram of the quantization process that generates a M-ary pyramid.

FIG. 4 illustrates a block diagram of the quantization process that generates a ternary pyramid, where M equals to three (3). More specifically, an eight-bit pixel value 255 (410*a*) is quantized into a two-bit pixel value 10 (420*a*) based on the difference between the child and parent pixels. Namely, a difference is computed between a parent 430*a* and each of its children 410*a–d*, where each of the four (4) differences is then quantized into three possible values 10, 00, and 01. Thus, pixel value 128 (410*b* and 410*c*) is quantized into a pixel value 00 (420*b* and 420*c*) and pixel value 0 (410*d*) is quantized into a pixel value 01 (420*d*). These representation levels are suitable for the bit wise XOR based cost function that will be used for motion estimation. They are also useful for feature detection and block classification. The M-ary pyramid reduces accuracy of the pixel values, thereby allowing rapid detection of "features" within an image. Features are defined as areas of high activities or intensity, e.g., the edges of an object. It should be noted that the levels 410 and 430 are levels of a mean pyramid, while level 420 is a level of a M-ary pyramid (where M=3). Both of these pyramids may have additional levels as illustrated in FIG. 4, but the M-ary pyramid will have one level less than the mean pyramid. Namely, one needs two mean pyramid levels 410 and 430 to generate a single M-ary pyramid level 420.

Furthermore, the significant reduction in the number of bits used to represent the pixel values translates into a reduction in computational overhead in the motion estimation process. For example, the block matching operation performed in the motion estimation process can be accelerated since there are fewer possible values that a pixel value can take on, thereby simplifying the overall block matching process.

Although M can be any value, it has been found that "lower order" M-ary pyramid, e.g., a binary pyramid decomposition can be more sensitive to noise than a "higher order" M-ary pyramid, e.g., a ternary pyramid. Namely, since the quantized pixel values in a binary pyramid can only take one of two possible values, noise may introduce errors, where a pixel value can be erroneously interpreted as having a value 1 instead of 0 or vice versa. However, a "higher order" M-ary pyramid requires more computational overhead. Thus, although it has been observed that an M-ary pyramid decomposition is best employed when M is greater than 2, the selection of a particular M-ary pyramid decomposition is often dictated by the requirement of the particular application. Once the M-ary pyramid is generated, method 1000 ends in step 1030 and returns to step 220 of FIG. 2.

It should be understood that the important aspect in step 210 is the generation of an M-ary pyramid for each of the input images in the image sequence. As such, although the preferred embodiment generates an M-ary mean pyramid, other types of M-ary pyramids can be employed in the present invention, e.g., an M-ary median pyramid, an M-ary Lowpass pyramid and so on.

Alternately, the inventive concept of a M-ary mean pyramid decomposition can be expressed in equation form. Let (i, j) represent the pixel locations on an image frame and let I(i, j) represent the intensity at location (i, j). Further, let l indicate the level within a pyramid, with $0 \leq l \leq L$, where L is the highest level in the pyramid. Then, the mean pyramids $X^l(i, j), 1 \leq l \leq L$ are constructed as follows:

$$X^l(i, j) = \frac{1}{4} \sum_{m=0}^{1} \sum_{n=0}^{1} X^{l-1}(2i+m, 2j+n) \quad (1)$$

where $X^0(i, j) = I(i, j)$.

Returning to FIG. 2, from these mean pyramids, information such as features within a block can be extracted in step 220 below. In one embodiment, the block is a 8×8 subblock of a macroblock, but it should be understood that the present invention is not limited to this block size. In particular, features like edges can be extracted from the variation of intensities within a block. This variation is represented by calculating the difference between the mean value at a level l, $0 \leq l \leq L-1$ and the mean value at level l+1. However, in order to obtain a robust feature, and in order to facilitate fast motion estimation, these differences are quantized to produce the M-ary pyramid. Each level of the M-ary pyramid will illustrate a pattern over the image that can be used to identify image features like edges and zero-crossings or for implementing motion estimation.

For example, a binary pyramid $B^l(i,j)$ of images can be built as follows:

$$B^l(i, j) = \begin{cases} 0 & \text{if } X^l(i, j) \geq X^{l+1}\left(\text{INT}\left(\frac{i}{2}\right), \text{INT}\left(\frac{j}{2}\right)\right) \\ 1 & \text{otherwise} \end{cases} \quad (1a)$$

where l indicates a level within the binary pyramid. Although equation (1a) illustrates a particular condition (quantizer step) that defines the two values ("0" and "1") of the binary pyramid, other conditions or quantizer steps can be used to define the two values ("0" and "1") of the binary pyramid in accordance with a particular application.

Alternatively, a ternary pyramid $Y^l(i, j)$ of images can be built. For example, denoting the pattern value in the M-ary (M=3) pyramid by $Y^l(i, j)$:

$$Y^l(i, j) = \text{Quant}\left[X^l(i, j) - X^{l+1}\left(\text{INT}\left(\frac{i}{2}\right), \text{INT}\left(\frac{j}{2}\right)\right)\right], 0 \leq l \leq L-1 \quad (2)$$

Denote the argument of Quant[·] by $\lambda$. For example, consider the case of ternary pyramids having a threshold T, and define $Y^l(i, j)$ as follows:

$$Y^l(i, j) = \begin{cases} 00 & |\lambda| < T \\ 01 & \lambda > T \\ 10 & \lambda < -T \end{cases} \quad (3)$$

This definition has the advantage of noise-robustness if the quantization threshold T (e.g., in the preferred embodiment T is selected to 5) is suitably chosen for a particular application. Namely, it is possible to define a "dead zone", e.g., $|\lambda| < T$, where slight variations in the pixel values due to noise can be removed effectively. Thus, any M-ary pyramids (M>2) having a dead zone around zero will minimize the noise sensitivity problem.

In relatively flat areas (areas of low activities), $Y^l(i, j)$ will contain a large number of zeros (0), while in regions containing edges, $Y^l(i, j)$ will contain a number of ones (1). Once the input image is decomposed into an M-ary pyramid, the blocks in the input image can be classified for the purpose of feature extraction using the M-ary pyramid, $Y^l(i, j)$. Namely, the M-ary pyramid can be used to rapidly detect features in the input image without incurring a high computational overhead. The detected features can be used to enhance the motion estimation process as discussed below or other image processing steps, e.g., segmentation of areas (such as objects) within an image, e.g., by using segmentation module 151. Segmentation is an important image processing step, where important areas in the image can be identified to receive special treatment. For example, the face of a person during a video conferencing application may demand special image processing such as receiving a greater allocation of coding bits. Additionally, segmentation can be employed to identify large objects where global motion estimation can be performed on these large objects.

It should be understood that the preceding discussion uses the ternary pyramid as an example and shows one possible method in which the quantization thresholds or levels can be assigned for feature identification and classification. In general, M-ary pyramids with $M \geq 2$ can be used with the specific assignment of the quantization thresholds being dependent on the requirement of a particular application and/or the content of the image sequence.

Returning to FIG. 2, after the M-ary pyramid is generated, method 200 proceeds to step 220 where the blocks in the frame are classified in terms of low activity or high activity in view of the M-ary pyramid. In the preferred embodiment, the "classification block size" is a 8×8 block having 64 M-ary pixel values represented by 128 bits. An "activity threshold" of 25 is set where the 8×8 block is classified as a high activity block if 25 or more pixel values are nonzero. Otherwise, the 8×8 block is classified as a low activity block. Additional higher block classification can be performed, e.g., classifying a macroblock as either a high activity or low activity macroblock. In the preferred embodiment, a macroblock comprising at least one subblock that is classified as high activity, causes the macroblock to be classified as high activity as well. It should be understood that the "classification block size" and the "activity threshold" can be adjusted according to a particular application and are not limited to those values selected in the preferred embodiment.

Returning to FIG. 2, after block classification, method 200 proceeds to step 230 where the block classifications are used to enhance the motion estimation process. Generally, motion estimates in areas with significant image features are more reliable than motion estimates in relatively "flat areas" with little changes due to the aperture problem (e.g., uniform areas where the content of the image are very similar for adjacent blocks). Therefore, the classification method described above is used to increase the reliability of motion estimates in general. However, it should be understood that it is not necessary to preclassify a block as to its content prior to the use of the M-ary pyramid in a motion estimation application. Namely, it should be understood that the present invention of an M-ary pyramid can be employed directly (as illustrated by a dashed line in FIG. 2) to enhance the performance of various types or different architectures of motion estimation methods.

More specifically, motion estimation is generally performed on a block by block basis in a raster scan order. The computational overhead or cost is generally evenly distributed over all the blocks during the motion estimation process. In the present invention, motion estimation in the "edge" blocks (high activity blocks) can be performed first using a cost function that depends on $Y^1(i, j)$, and/or $X^1(i, j)$. This approach allows the emphasis of the features in the image and provide robust, reliable motion estimates in the presence of sensor noise, quantization noise, and illumination changes. An example of a cost function could involve a bit-wise XOR operation on the M-ary levels in the pyramid, which can be implemented as a fast method on certain architectures. The cost function is used to determine the "best match". Let us consider an M-ary valued block at time t (current frame), $Y^1(i, j, t)$ and another M-ary valued block at time t−1 (previous frame) $Y^1(m,n,t-1)$. The cost function is then expressed as:

$$\sum_{\substack{\text{pixels within}\\ \text{the block}}} \text{Number of ones in } \{Y^l(i, j, t) \otimes Y^l(m, n, t - 1)\} \quad (4)$$

where $\otimes$ represents a bitwise XOR operation. This cost function produces substantial computational savings compared to the standard "absolute difference" cost function used on the original 8-bit pixel intensity values. This procedure is performed hierarchically over the M-ary pyramid.

Figure 5:
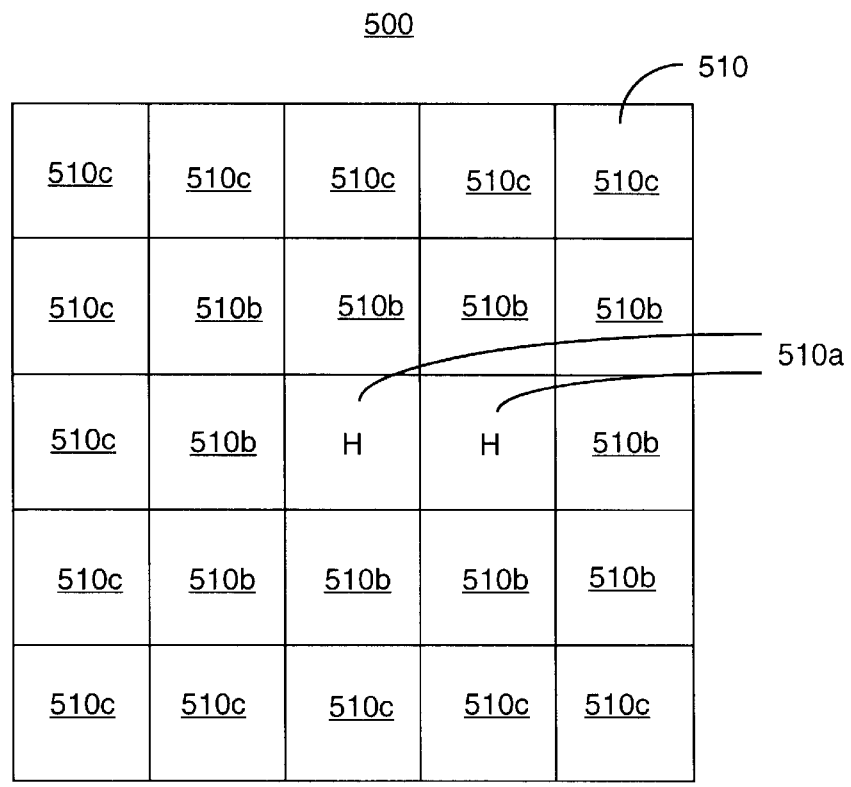
FIG. 5 illustrates an input frame which has been divided and classified into a plurality of blocks.

In other words, the motion estimation method is initiated at the high activity blocks. FIG. 5 illustrates an input frame 500 which has been divided and classified into a plurality of blocks 510. In the preferred embodiment, two blocks 510a have been classified as high activity blocks. As such, motion estimation is performed on these two blocks first. In fact, the computational cost can be increased for these two blocks, since these high activity blocks (high-confidence "edge" blocks), will most likely provide very high accuracy motion vectors. Thus, more intensive motion estimations are performed in these two blocks than other blocks in the image frame 500, e.g., the high activity blocks can be split to obtain more accurate motion vectors, "half pel" motion estimation can be performed in these two blocks or finer search strategies may be employed.

In turn, after motion estimation is completed for the high activity blocks, the motion estimation will then propagate to the low activity blocks ("Low-confidence" blocks) in the image. However, this propagation is done intelligently depending on the region or object segmentation that is obtained from the classification. This propagation is performed by using the motion of the edge blocks as an initialization for the motion of adjacent blocks, and using a relatively small search-range to refine this initialization. Namely, the motion estimation process propagates (e.g., in a spiraling order) to blocks 510b, where the initial search area is derived from the motion vectors of the high activity blocks. In turn, this propagation strategy is then extended to "flat" blocks, e.g., blocks 510c and so on, that do not lie adjacent to an "edge" block, and has the advantage of fast computation since the refinement search-range is relatively small. Furthermore, the motion estimates will be smoother and easier to encode, which is a major advantage in very low bit rate (VLBR) applications where motion information forms a significant portion of the bit-stream. Furthermore, these smoother motion estimates can be expected to perform better in a temporal interpolation application.

Finally, the classification method also produces computational savings when half-pel refinements are used to increase accuracy of motion estimation. The half-pel refinements are performed only on the "edge" blocks, and not on the relatively flat areas of the image.

An alternative embodiment of the present invention involves the use of "N-scale tiling" with an M-ary pyramid to effect motion estimation. More specifically, in this alternative embodiment, a 4-level binary pyramid is constructed as follows:

$$X^l(i, j) = \text{INT}\left\{\frac{1}{4}\sum_{m=0}^{1}\sum_{n=0}^{1} X^{l-1}(2i+m, 2j+n)\right\} \quad 1 \le l \le 3 \quad (5)$$

where $X^1(i, j)$ represents the gray level at the position (i, j) of the lth level and $X_0(i, j)$ denotes the original image.

Secondly, the 4-level binary pyramidal images are built as follows:

$$B^l(i, j) = \begin{cases} 0 & \text{if } X^l(i, j) \ge X^{l+1}\left(\text{INT}\left(\frac{i}{2}\right), \text{INT}\left(\frac{j}{2}\right)\right) \\ 1 & \text{otherwise} \end{cases} \quad (6)$$

where $0 \le l \le 2$ $$B^3(i, j) = X^3(i, j) \quad (7)$$

It should be noted that the present N-scale tiling embodiment employs a modified binary pyramid having a highest level of the pyramid represented by equation (7). However, the present N-scale tiling embodiment can be implemented in combination with the M-ary pyramids as discussed above (e.g., equations 1, 1a or 2) or other modified M-ary pyramids as disclosed in an accompanying patent application filed simultaneously herewith on Jun. 29, 1998 with the title "Apparatus And Method For Performing Scalable Hierarchical Motion Estimation" (Ser. No. 09/106,706), hereby incorporated by reference.

Figure 11:
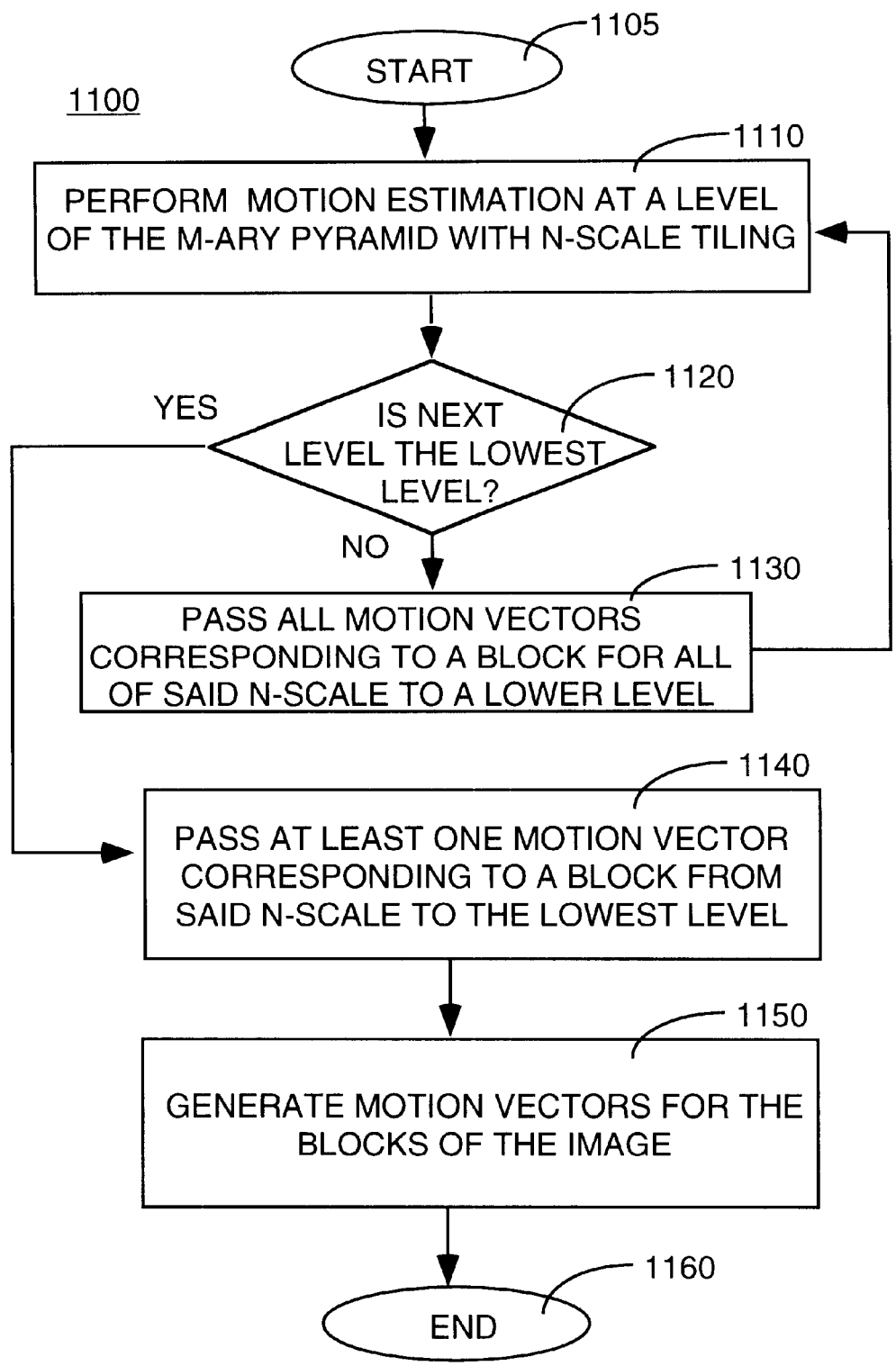
FIG. 11 illustrates a flowchart of a method for performing motion estimation on an M-ary pyramid with N-scale tiling.

FIG. 11 illustrates a flowchart of a method 1100 for performing motion estimation on an M-ary pyramid with N-scale tiling. More specifically, method 1100 starts in step 1105 and proceeds to step 1110 where N-scale tiling is performed on the binary pyramid (M=2 for illustration purposes), starting from the highest level of the pyramid. Generally, motion estimation is performed to estimate the motion or displacement of a current block (e.g., a macroblock of 16×16 pixels), where the entire frame is divided into a plurality of non-overlapping current blocks. However, N-scale tiling is the process of performing motion estimation for a current block of the frame using "N" different "tiling block" sizes as illustrated in FIG. 7.

Figure 7:
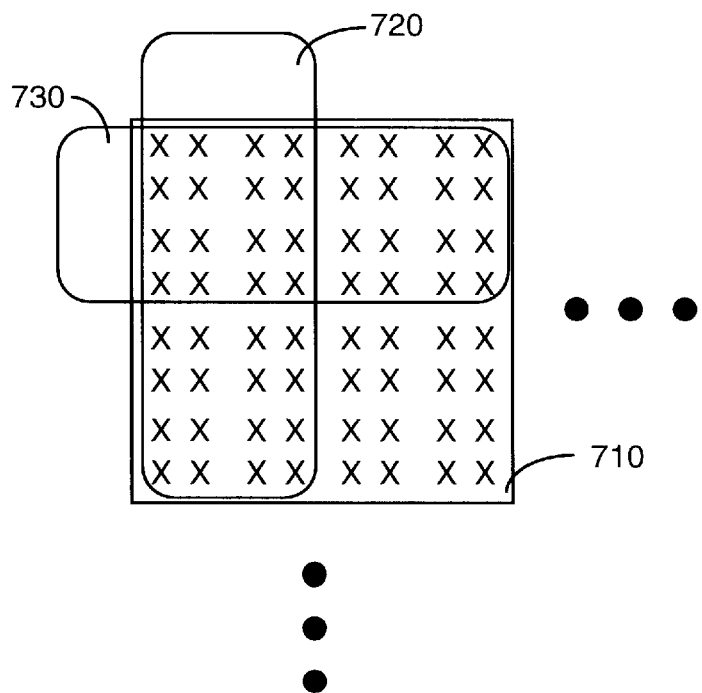
FIG. 7 illustrates a block diagram of a block of pixels with 3-scale tiling.

FIG. 7 illustrates a block diagram of a block of pixels 710 where 3-scale tiling is performed. More specifically, block 710 is one of a plurality of 8×8 blocks within a frame. In the preferred embodiment, motion estimation is performed using three (N=3) different block sizes, e.g., an 8×8 block size 710, an 8×4 block size 720 and a 4×8 block size 730. Thus, three (3) motion vectors are generated for each 8×8 block within each frame, i.e., the block is "tiled" with three different block sizes or scales. In a preferred embodiment of the present invention, three-scale tiling (N=3) is initially performed in the highest level (lowest resolution of the M-ary pyramid), thereby generating three motion vectors for each block.

In step 1120, method 1100 queries whether the next level is the lowest level of the M-ary pyramid. If the query is answered negatively, then method 1100 proceeds to step 1130 where the three motion vectors are passed to a lower level, i.e., one motion vector for each scale is passed to a lower level of the M-ary pyramid. In turn, method 1100 returns to step 1110 for the next lower level, where a refinement is performed based on the received motion vectors from the higher level to produce another three motion vectors which are passed to lower levels, where the motion vectors are refined at each level and so on.

However, if the query in step 1120 is answered positively, then method 1100 proceeds to step 1140, where only one motion vector is selected from level 1 to be passed to level 0 (lowest level (highest resolution) of the M-ary pyramid). The selection of the motion vector from level 1 to be passed to level 0 is based on the motion vector that minimizes the motion-compensated predicted error for the block. It should be noted that the target block size at full resolution is 16×16. Next, a final motion vector is determined in step 1150 for each 16×16 block using the motion vectors passed from step 1140 and method 1100 ends in step 1160.

The features of implementing N-scale tiling in combination with an M-ary pyramid include the ability to perform motion estimation in the Boolean domain (when M=2). This feature reduces the data transfer time between the frame buffer and the motion estimator 140. Furthermore, implementing motion estimation with 3-scale tilings allows an encoder to discriminate between the motion of larger structures versus the motion of smaller features within the frame under consideration. For example, if a motion vector is selected for a current block that correlates to a small tiling block, e.g., an 4×8 or an 8×4 block instead of an 8×8 block, then one can infer that there may be motion of the "features" or subblocks within the current block. Thus, one can set up a histogram to gauge the contribution of different tiling scales with respect to the motion vectors that are ultimately selected for the current blocks of a frame. The histogram can be analyzed to deduce motion of large structures or smaller features within a structure and so on.

It should be understood that although the preferred embodiment employs three scales, "N" number of scales can be employed with different block sizes. Furthermore, the present invention can be modified such that any number of motion vectors for each block can be passed from level to level.

The above hierarchical motion estimation method with 3-scale tilings can be expressed in equation form. Namely, let $F_m$ denote the mth image frame in a sequence of image frames, where each frame is partitioned into non-overlapping blocks of size "s". The resulting partition or tiling is represented by $F_m^{l,s}$ at resolution l. The intensity value of the pixel with coordinates $x=[x_1,x_2]^T$ in image frame m at resolution l is denoted by $F_m^l(x)$. For a given $s=[s_1,s_2]^T$, the block of pixels with upper left corner at image position x is referred to as $B_m^l(x,s)=\{F_m^l(q)\epsilon F_m^l | x \leq q < x+s\}$. The sum of the absolute differences (SAD) between pixels from a block $B_m^l(x,s)$ from frame m and corresponding pixels in block $B_{m-1}^l(x,s)$ from frame m−1 can be represented as:

$$B_m^l(x,s) - B_{m-1}^l(x,s) = \sum_{0 \leq d < s} |F_m^l(x+d) - F_{m-1}^l(x+d)| \qquad (8)$$

The sum of XOR Boolean operation ($\oplus$) between pixels from a block $B_m^l(x,s)$ from frame m and corresponding pixels in block $B_{m-1}^l(x,s)$ from frame m−1 can be denoted as:

$$B_m^l(x,s) \oplus B_{m-1}^l(x,s) = \sum_{0 \leq d < s} \phi(F_m^l(x+d) \oplus F_{m-1}^l(x+d)) \qquad (9)$$

$$\phi(F_m^l(x+d) \oplus F_{m-1}^l(x+d)) = \begin{cases} 0 & \text{if } F_m^l(x+d) = F_{m-1}^l(x+d) \\ 1 & \text{otherwise} \end{cases} \qquad (10)$$

Let $F^{0,s}$ be a tiling defined on the full resolution image with cardinality k. For the lower resolution images, 3-scale tilings are considered as $\{F^{l,s}\}_{l=1}^3$, $\{F^{l,s1}\}_{l=1}^3$, and $\{F^{l,s2}\}_{l=1}^3$. It should be noted that $s1=[s_1/2,s_2]^T$ and $s2=[s_1,s_2/2]^T$, but other block sizes can be used.

First, the motion vector fields $v_s^3$, $v_{s1}^3$, and $v_{s2}^3$ in level 3 in a four level pyramid (0–3 levels) are defined as follows:

$$v_s^3 = \arg\min_{v \in \Omega^3} B_m^3(x,s) - B_{m-1}^3(x+v,s) \qquad (11)$$

$$v_{s1}^3 = \arg\min_{v \in \Omega^3} B_m^3(y,s1) - B_{m-1}^3(y+v,s1) \qquad (12)$$

$$v_{s2}^3 = \arg\min_{v \in \Omega^3} B_m^3(z,s2) - B_{m-1}^3(z+v,s2) \qquad (13)$$

where $\Omega^3 = \{v: -d^3 \leq v \leq d^3\}$ where $-d^3$ and $d^3$ are $-M/8$ and $M/8$, respectively, M is the number of pixels in the search window. Next, for level 2 and level 1, from lower resolution l+1 to the higher resolution l (l=2 and l=1), the motion vector fields are propagated according to the following:

$$u_s^l = 2v_s^{l+1} \qquad (14)$$

$$u_{s1}^l = 2v_{s1}^{l+1} \qquad (15)$$

$$u_{s2}^l = 2v_{s2}^{l+1} \qquad (16)$$

Namely, the motion vector fields from the lower resolution are doubled prior to performing refinement on the motion vector fields.

Next, the motion vector fields at the resolution l are refined as follows:

$$v_s^l = \arg\min_{v \in \Omega^l} B_m^l(x + u_s^l, s) \oplus B_{m-1}^l(x + u_s^l + v, s) \quad (17)$$

$$v_{s1}^l = \arg\min_{v \in \Omega^l} B_m^l(y + u_{s1}^l, s1) \oplus B_{m-1}^l(y + u_{s1}^l + v, s1) \quad (18)$$

$$v_{s2}^l = \arg\min_{v \in \Omega^l} B_m^l(z + u_{s2}^l, s2) \oplus B_{m-1}^l(z + u_{s2}^l + v, s2) \quad (19)$$

where
$\Omega_l = \{v: -d^l \leq v \leq d^l\}$; and
where $-d^1$ and $d^1$ are $-3$ and $3$, respectively
Finally, for level 0:

$$v^1 = \psi(v_s^1, v_{s1}^1, v_{s2}^1) \quad (20)$$

$$\psi(v_s^1, v_{s1}^1, v_{s2}^1) = \arg\min_{v \in \{v_s^1, v_{s1}^1, v_{s2}^1\}} B_m^1(x, s) \oplus B_{m-1}^1(x + v, s) \quad (21)$$

$$u^0 = 2v^1 \quad (22)$$

$$v^0 = \arg\min_{v \in \Omega^0} B_m^0(x + u^0, s) \oplus B_{m-1}^0(x + u^0 + v, s) \quad (23)$$

where
$\Omega_0 = \{v: -d^0 \leq v \leq d^0\}$
where $-d^0$ and $d^0$ are $-3$ and $3$, respectively.

The present hierarchical motion estimation using a binary pyramid with 3-scale tiling provides an efficient motion estimation method that is computational inexpensive. To illustrate, if the width and the height of the video image is W and H, respectively. The search window has ±M pixels. The conventional full-search block matching method would require 1 subtraction, 1 accumulation, and 1 absolute operation for a single pixel matching. Thus, the computational complexity (operations per frame) is approximated as:

$$C_{FULL} \approx W \times H \times 4 \times M^2 \times 3 = 12WHM^2 \quad (24)$$

For the present invention, the same full search method can be used. The block size at level 0 is 16×16. The same block size of 8×8 is used at level 1, level 2, and level 3. The effective search range at level 0, level 1, and level 2 is set to ±3. The effective search range at level 3 is set to ±M/8.

At level 3, the computational complexity is approximated as:

$$C_0 \approx \frac{WH}{64} \times \frac{M^2}{64} \times 4 \times 3 = \frac{3WHM^2}{1024} \quad (25)$$

At level 2 and level 1, each 8×8 block can be represented by four 16-bit vectors. A 16-bit XOR Boolean operator can be implemented using one 16-bit exclusive-or arrays, a dual-port look-up table (LUT) with 65536 entries. The 8×8 block then needs 4/64 accumulations for the basic matching. Likewise, the 8×4 block needs 2/32 accumulations for the basic matching. Then, the computational complexity at level 2 and level 1 is approximated as:

$$C_{2,1} \approx \frac{WH}{16} \times \left(\frac{4}{64} + \frac{2}{32} \times 2\right) \times 49 + \frac{WH}{4} \times \left(\frac{4}{64} + \frac{2}{32} \times 2\right) \times 49 = \frac{147WH}{256} + \frac{147WH}{64} \quad (26)$$

At level 0, the 16×16 block needs 16/256 accumulations for the basic matching. The computational complexity is approximated as:

$$C_0 \approx WH \times \frac{32}{256} \times 49 = \frac{49WH}{16} \quad (27)$$

Therefore, the computational complexity $C_{HMEBP}$ of the present invention can be approximated as:

$$C_{HMEBP} = C_3 + C_{2,1} + C_0 = \frac{3WHM^2}{1024} + \frac{1519WH}{256} \quad (28)$$

Finally, the ratio between $C_{HMEBP}$ and $C_{FULL}$ is expressed as:

$$\frac{C_{HMEBP}}{C_{FULL}} = \frac{\frac{3WHM^2}{1024} + \frac{1519WH}{256}}{12WHM^2} = \frac{1}{4096} + \frac{1519}{3072M^2} \quad (29)$$

Thus, equation (29) demonstrates the small computational complexity of the present invention as compared with the conventional full search method.

It should be noted that although the present invention employs N-scale tiling consistently throughout an entire level of the M-ary pyramid, the present invention is not so limited. In fact, N-scale tiling can be adjusted within each level of the M-ary pyramid. Namely, one can employ different N-scale tiling to different sets of blocks within each level. For example, if a block is particularly important, then one can employ 5-scale tiling for an 8×8 block (e.g., one 8×8 tiling block, two 4×8 tiling blocks and 8×4 tiling blocks). In contrast, if a block is not particularly important in the same level of the M-ary pyramid, then one can employ 1-scale tiling for an 8×8 block (e.g., one 8×8 tiling block) to reduce the number of computational cycles. Thus, the above block classification (high activity and low activity) method can be used to dictate the level of N-scaling that will be employed for each block in each level of the M-ary pyramid. In fact, any other block classification methods can be used in conjunction with the present invention.

Alternatively, the above hierarchical motion vector estimation method with variable tiling block sizes can be implemented with a mean pyramid as illustrated FIG. 3. Namely, motion estimation is performed directly on the mean pyramid instead of the M-ary pyramid.

To illustrate, at the topmost level of a mean pyramid, motion estimation is performed with two different block sizes for discriminating between the motion of larger features and the motion of smaller features for a current frame under consideration. More specifically, a 4-level mean pyramid is constructed in accordance with equation (5) above, where $X^1(i,j)$ represents the gray level at the position (i,j) of the lth level and $X^0(i,j)$ denotes the original image.

Hierarchical motion estimation is then performed from a coarse level to a finer level of the mean pyramid. Assuming 16×16 target blocks at full resolution, hierarchical motion estimation begins at level 3, where a search is performed for two block sizes, e.g., 4×4 blocks and 8×8 blocks (additional number of tiling blocks and/or tiling block sizes can be used).

Next at level 2 and level 1, each candidate motion vector is then refined at two different scales and the best motion vector from each scale is propagated to the next level for further refinement. Finally, at level 0, one motion vector is selected for refinement for each block on the basis of minimizing the motion-compensated predicted error. The computational expense of this hierarchical motion estimation with mean pyramid and variable tiling block sizes is less than conventional hierarchical motion estimation methods, but is greater than the above hierarchical motion estimation with M-ary pyramid and variable tiling block sizes.

Figure 8:
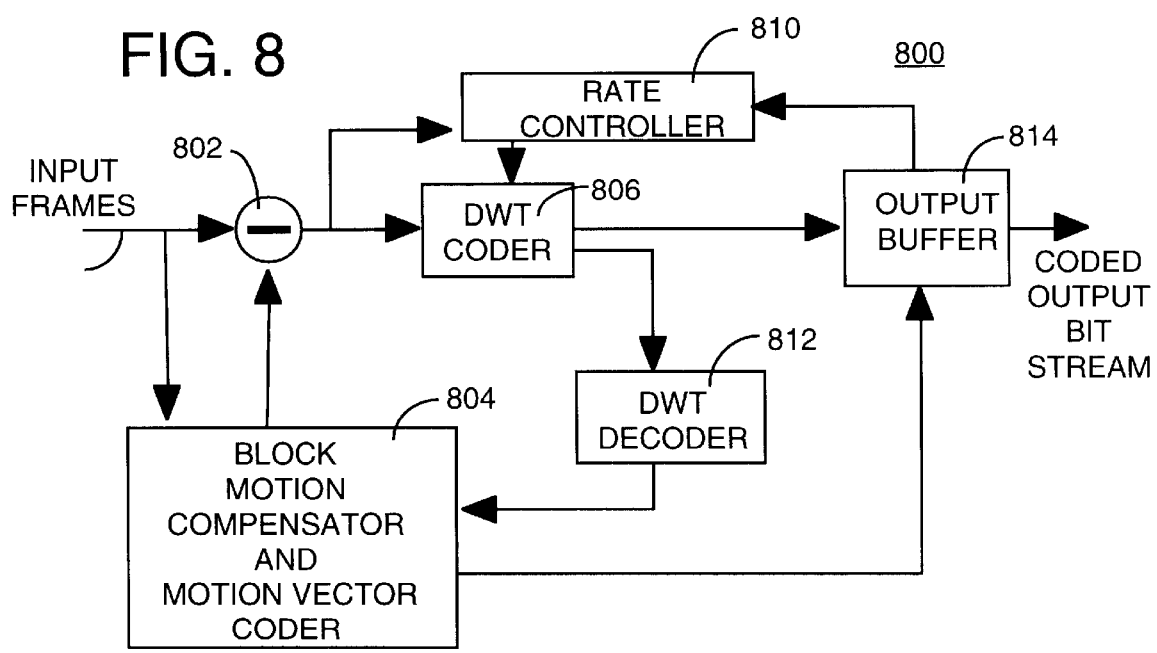
FIG. 8 illustrates a block diagram of a second embodiment of the apparatus of the present invention.

FIG. 8 depicts a wavelet-based encoder 800 that incorporates the present invention. The encoder contains a block motion compensator (BMC) and motion vector coder 804, subtractor 802, discrete wavelet transform (DWT) coder 806, bit rate controller 810, DWT decoder 812 and output buffer 814.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 804, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 9:
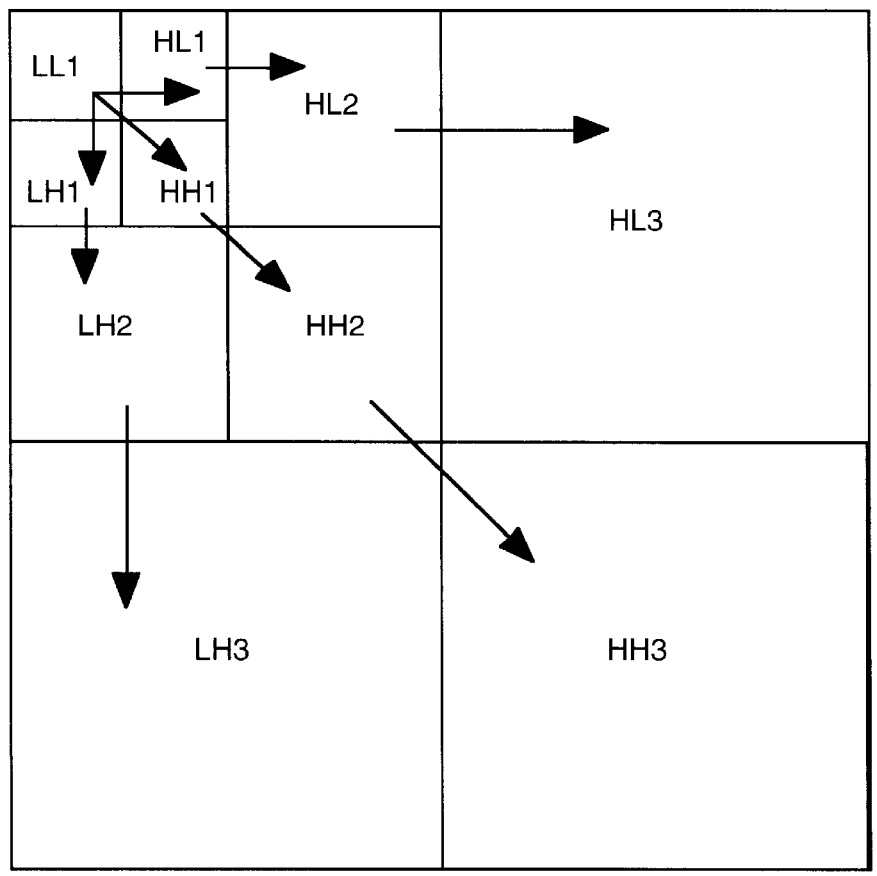
FIG. 9 illustrates a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 9 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 8 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up). The selection of the proper quantization level by the rate controller 810 is as discussed above to control the bit rate for each macroblock within each frame of a sequence. As such, the present invention can be adapted to various types of encoders that use different transforms.

Figure 6:
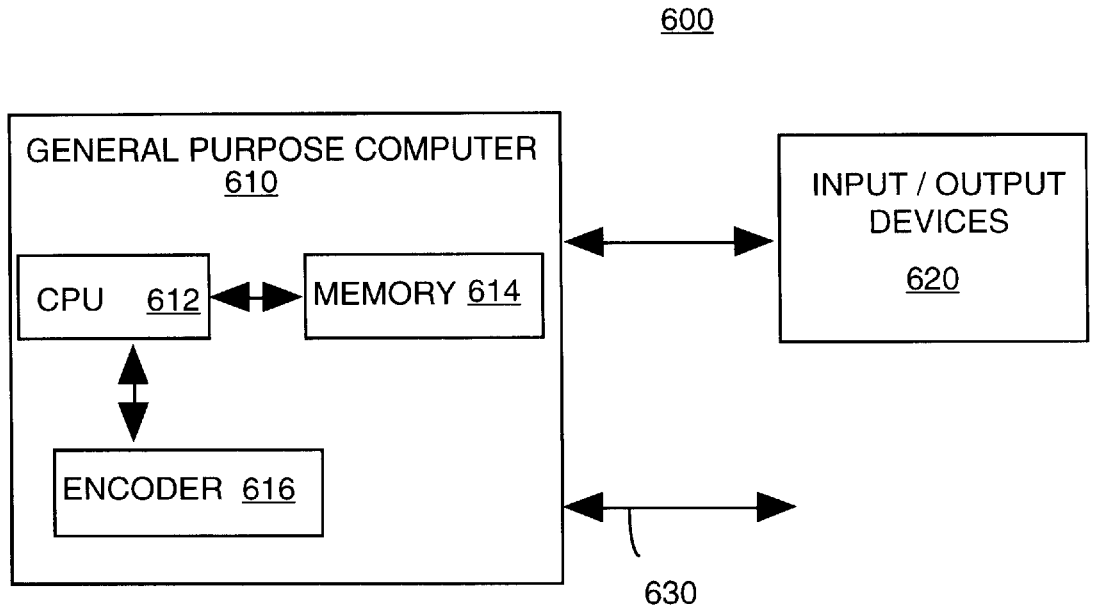
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 and 800 as discussed above. The encoder 616 can be a physical device which is coupled to the CPU 612 through a communication channel. Alternatively, the encoder 616 can be represented by a software application (or a combination of software and hardware, e.g., application specific integrated circuits (ASIC)), which is loaded from a storage device, e.g., a magnetic or optical disk, and resides in the memory 612 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

Although various embodiments which incorporate the teachings of the present invention have been shown and described in detail herein, those skilled in the art can readily devise many other varied embodiments that still incorporate these teachings.

What is claimed is:

1. A method for performing motion estimation for a sequence of images, said method comprising the steps of:
   (a) generating an M-ary pyramid having a plurality of levels for each of said images, where each image is divided into a plurality of blocks;
   (b) generating a plurality of motion vectors based on a plurality of tiling blocks sizes; and
   (c) passing at least one of said motion vectors for each of said blocks to a lower level of said M-ary pyramid.

2. The method of claim 1, wherein said M-ary pyramid generating step (a) generates a binary pyramid for each of said images.

3. The method of claim 1, wherein said M-ary pyramid generating step (a) comprises the steps of:
   (a1) generating a mean pyramid for the image; and
   (a2) generating said M-ary pyramid from said mean pyramid.

4. The method of claim 3, wherein said M-ary pyramid generating step (a2) comprises the step of quantizing a plurality of differences between children and parent pixels of said mean pyramid.

5. The method of claim 4, wherein said M-ary pyramid is a binary pyramid.

6. The method of claim 5, wherein said binary pyramid is formed in accordance with:

$$B^l(i, j) = \begin{cases} 0 & \text{if } X^l(i, j) \geq X^{l+1}\left(\text{INT}\left(\frac{i}{2}\right), \text{INT}\left(\frac{j}{2}\right)\right) \\ 1 & \text{otherwise} \end{cases}$$

where l is a level of said M-ary pyramid, and where $B^1(i,j)$ is a value at a location (i,j).

7. The method of claim 1, wherein said motion vectors generating step (b) is performed hierarchically from a highest level of said M-ary pyramid to a lower level of said M-ary pyramid.

8. The method of claim 7, wherein said passing step (c) passes said motion vectors for each of said blocks to a lower level of said M-ary pyramid from a higher level of said M-ary pyramid for all levels above a lowest level of said M-ary pyramid.

9. The method of claim 7, wherein said motion vectors generating step (b) is performed for three tiling block sizes for each of said blocks to produce three motion vectors for each of said blocks.

10. The method of claim 9, wherein said three tiling block sizes are eight pixels by eight pixels, eight pixels by four pixels, and four pixels by eight pixels.

11. The method of claim 9, wherein said passing step (c) comprises the steps of:
  (c1) passing said three motion vectors for each of said blocks from a higher level of said M-ary pyramid for all levels above a lowest level of said M-ary pyramid; and
  (c2) passing only one of said three motion vectors for each of said blocks from a level immediately above the lowest level to the lowest level of said M-ary pyramid.

12. An apparatus for performing motion estimation for a sequence of images, said apparatus comprises:
  an M-ary pyramid generator for generating an M-ary pyramid having a plurality of levels for each of said images, where each image is divided into a plurality of blocks; and
  a motion estimation module for performing hierarchical motion estimation on said M-ary pyramid, where motion vectors are generated in accordance with a plurality of tiling block sizes, and where at least one of said motion vectors for each of said blocks is passed to a lower level of said M-ary pyramid.

13. The apparatus of claim 12, wherein said M-ary pyramid is a binary pyramid.

14. The apparatus of claim 12, wherein said M-ary pyramid generator comprises a mean filter to generate a mean pyramid.

15. The apparatus of claim 13, wherein said M-ary pyramid generator comprises a quantizer for generating said binary pyramid in accordance with:

$$B^l(i, j) = \begin{cases} 0 & \text{if } X^l(i, j) \geq X^{l+1}\left(\text{INT}\left(\frac{i}{2}\right), \text{INT}\left(\frac{j}{2}\right)\right) \\ 1 & \text{otherwise} \end{cases}$$

where l is a level of said M-ary pyramid, and where $B^l(i, j)$ is a value at a location (i, j).

16. The apparatus of claim 12, wherein said motion vectors for each of said blocks are passed to a lower level of said M-ary pyramid from a higher level of said M-ary pyramid for all levels above a lowest level of said M-ary pyramid.

17. The apparatus of claim 12, wherein said three tiling block sizes are eight pixels by eight pixels, eight pixels by four pixels, and four pixels by eight pixels.

18. A computer-readable medium having stored thereon a plurality of instructions, the plurality of instructions including instructions which, when executed by a processor, cause the processor to perform steps on a sequence of images comprising:
  (a) generating an M-ary pyramid having a plurality of levels for each of said images, where each image is divided into a plurality of blocks;
  (b) generating a plurality of motion vectors based on a plurality of tiling blocks sizes; and
  (c) passing at least one of said motion vectors for each of said blocks to a lower level of said M-ary pyramid.

19. The computer-readable medium of claim 18, wherein said M-ary pyramid generating step (a) generates a binary pyramid for each of said images.

20. Apparatus for encoding an image sequence having at least one input frame, said apparatus comprising:
  a motion compensator for generating a predicted image of a current input frame, said motion compensator comprising an M-ary pyramid generator for generating an M-ary pyramid having a plurality of levels for said input frame, where said input frame is divided into a plurality of blocks and a motion estimation module for performing hierarchical motion estimation on said M-ary pyramid, where motion vectors are generated in accordance with a plurality of tiling block sizes, and where at least one of said motion vectors for each of said blocks is passed to a lower level of said M-ary pyramid;
  a transform module for applying a transformation to a difference signal between the input frame and said predicted image, where said transformation produces a plurality of coefficients;
  a quantizer for quantizing said plurality of coefficients with at least one quantizer scale to produce a plurality of quantized coefficients; and
  a coder for coding said quantized coefficients into a bitstream.

* * * * *